United States Patent [19]

Shaw

[11] Patent Number: 4,974,122
[45] Date of Patent: Nov. 27, 1990

[54] COMPACT LCD LUMINAIRE

[75] Inventor: James E. Shaw, Cedar Rapids, Iowa

[73] Assignee: Rockwell International Corporation, El Segundo, Calif.

[21] Appl. No.: 330,393

[22] Filed: Mar. 28, 1989

[51] Int. Cl.$^5$ ................................................ F21V 5/00
[52] U.S. Cl. .................................... 362/31; 362/32; 362/27; 362/260; 362/307; 350/345; 40/546
[58] Field of Search .................. 362/31, 32, 26, 27, 362/216, 223, 260, 327, 307, 244, 245, 246, 29, 30, 268, 331, 332; 40/546, 547; 350/345, 330

[56] References Cited

U.S. PATENT DOCUMENTS

| | | | |
|---|---|---|---|
| 2,347,665 | 5/1944 | Christensen et al. | 40/546 |
| 2,712,593 | 7/1955 | Merchant | 362/27 |
| 3,464,133 | 9/1969 | Poray | 40/546 |
| 3,752,974 | 8/1973 | Baker et al. | 240/1 |
| 3,947,091 | 3/1976 | Trcka | 350/160 |
| 4,212,048 | 7/1980 | Castleberry | 362/19 |
| 4,229,783 | 10/1980 | Eberhardt | 362/352 |
| 4,277,817 | 7/1981 | Hehr | 362/31 |
| 4,371,870 | 2/1983 | Biferno | 340/716 |
| 4,373,282 | 2/1983 | Wragg | 40/546 |
| 4,453,200 | 6/1984 | Trcka et al. | 362/307 |
| 4,519,679 | 5/1985 | Horikiri et al. | 350/339 |
| 4,618,216 | 10/1986 | Suzawa | 350/345 |
| 4,626,074 | 12/1986 | Crossland et al. | 350/345 |
| 4,641,925 | 2/1987 | Gasparaitis et al. | 350/345 |
| 4,664,481 | 5/1987 | Ito et al. | 350/345 |
| 4,668,049 | 5/1987 | Canter et al. | 350/345 |
| 4,714,983 | 12/1987 | Lang | 362/27 |
| 4,748,546 | 5/1988 | Ukrainsky | 362/223 |

FOREIGN PATENT DOCUMENTS 3208162 10/1982 Fed. Rep. of Germany ........ 362/31
31104 11/1926 France .................................. 362/31

Primary Examiner—Ira S. Lazarus
Assistant Examiner—D. M. Cox
Attorney, Agent, or Firm—John C. McFarren; M. Lee Murrah; H. Fredrick Hamann

[57] ABSTRACT

A compact backlighting luminaire is provided for liquid crystal displays (LCDs). The body of the luminaire is formed of optically clear glass or acrylic resins. The body comprises a mesa extending from a base comprising a flange extending around the periphery of the mesa. The top of the mesa comprises at least two non-parallel sloped surfaces. The base of the luminaire body may form a wedge with the flange being thicker at one edge than at an opposite edge. The bottom surface and edges of the body may be coated with a reflective film. A fluorescent lamp extends around the periphery of the mesa and is supported by the flange. A cover may be provided to extend over the mesa and around the periphery of the flange to secure the lamp, to reduce illumination losses, and to provide a mounting surface for an LCD. Light from the lamp is reflected by the bottom and edge surfaces of the body and is incident on the sloped top surfaces of the mesa to provide uniform backlighting illumination for and LCD mounted atop the cover of the luminaire. The luminaire provides effective backlighting for full color flat panel displays without adding significantly to the depth dimension of the flat panel display.

1 Claim, 1 Drawing Sheet

COMPACT LCD LUMINAIRE

TECHNICAL FIELD

The present invention relates to backlighting systems for liquid crystal displays (LCDs) and, in particular, to a compact LCD luminaire having multiple sloped surfaces.

BACKGROUND OF THE INVENTION

The range of applications for liquid crystal displays (LCDs) has increased dramatically as the characteristics of LCD displays have improved. In applications such as flat panel avionics displays and flat planel television having full color capability, it is necesssary to provide effective illumination rather than relying merely on ambient light. In flat panel displays, it is particularly desirable to have a backlight source that provides effective illumination intensity and uniformity without adding significantly to the depth dimension of the flat panel.

The use of wedge-shaped optical devices for light distribution is well known in the prior art. With such devices, light is generally injected at the large end of the wedge so that it reflects within the optical device until the critical angle of the illumination surface of the wedge is exceeded. The surfaces of the wedge may be coated or treated so that the injected light is internally reflected by all surfaces except for the emission surface which provides the illumination.

Although many types of illumination devices are known in the prior art, there is nevertheless a need for a compact LCD luminaire that provides a bright, uniform backlilght source for full color flat panel displays and that minimizes the depth dimension of the overall flat panel display.

SUMMARY OF THE INVENTION

The present invention comprises a compact backlighting luminaire for a liquid crystal display (LCD). The luminaire incorporates a fluorescent lamp and an optical body having a plurality of sloped, wedge-shaped surfaces to provide effective and uniform backlighting for flat panel LCD displays. The compact structure of the luminaire provides effective illumination while minimizing the physical depth dimension of the illuminated flat panel display.

The preferred embodiment of the present invention comprises a generally rectangular luminair body formed of optically clear glass or acrylic resin. The luminaire body has a base that forms a flange extending around the periphery of the body. The remaining portion of the body forms a mesa structure above the base. The flange extending around the mesa serves as a mounting and support structure for one or more fluorescent tubes extending around the mesa and providing illumination for the luminaire. In the preferred embodiment of the present invention, the upper surface of the mesa structure is sloped from the two opposite lateral edges to form a slight V-shaped through that extends from the top edge to the bottom edge of the upper surface of the mesa. In addition, the lower surface of the base may be sloped so as to form a wedge with the flange being thicker along the top edge than along the bottom edge of the luminaire. The sloped lower surface and the edges of the base may be coated so that they act to reflect light from the fluorescent lamps. Light from the fluorescent lamps, including the light reflected by the bottom and edge surfaces, is incident on the sloped upper surfaces of the mesa to provide effective backlighting intensity and uniformity for an LCD mounted above the mesa. A reflectively coated cover may be placed over the luminaire to secure the fluorescent lamps, reduce illumination losses, and provide a mounting surface for the LCD.

BRIEF DESCRIPTION OF THE DRAWINGS

For a more complete understanding of the present invention and for further advantages thereof, reference is made to the following Description of the Preferred Embodiment taken in conjunction with the accompanying Drawings, in which.

DESCRIPTION OF THE PREFERRED EMBODIMENT

Figure 1:
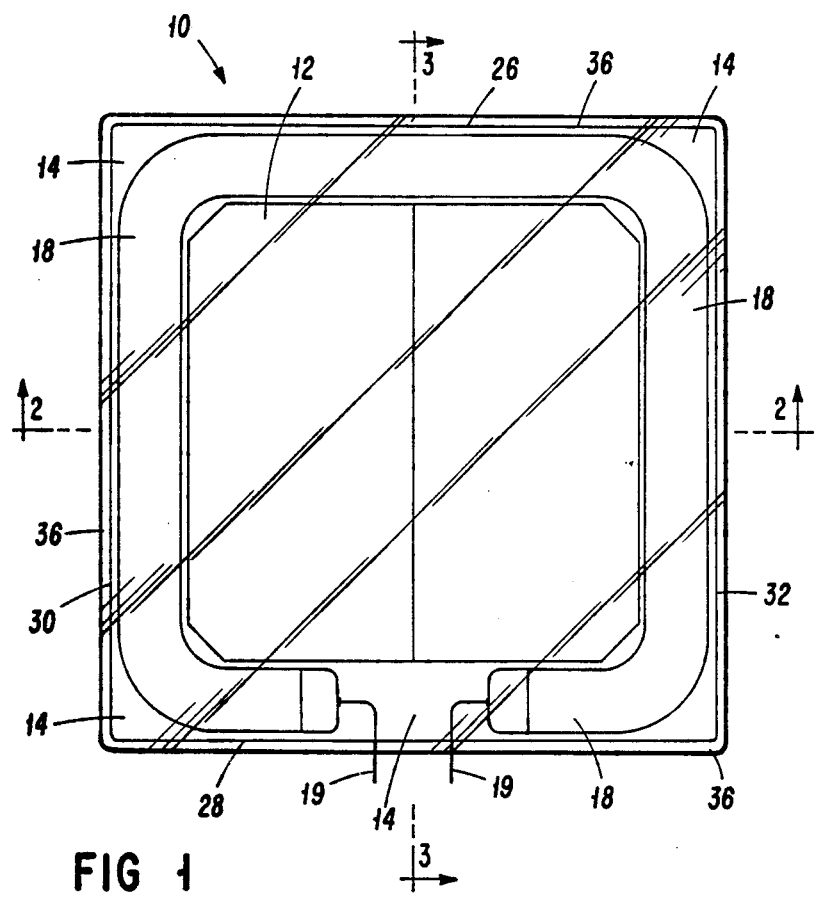
FIG. 1 is a top plan view of an LCD luminaire of the present invention.
Figure 3:
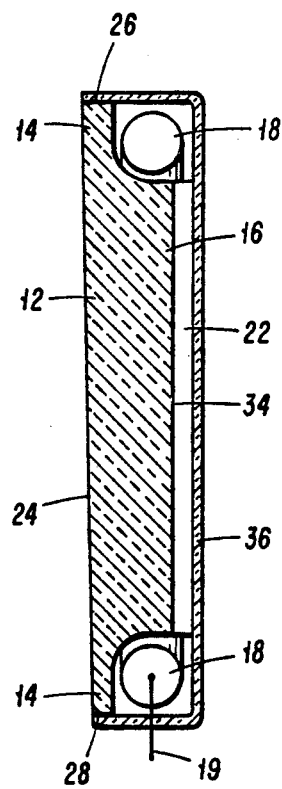
FIG. 3 is a cross-sectional view of the luminaire taken along the section line 3—3 of FIG. 1.
Figure 2:
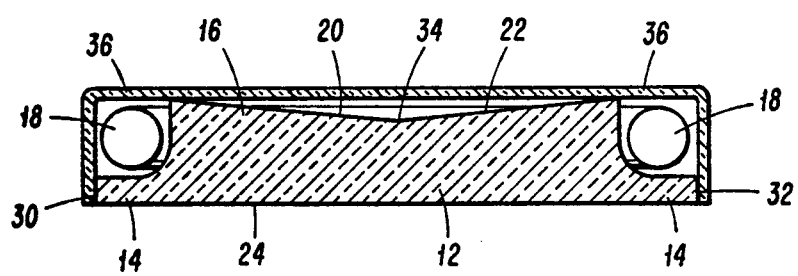
FIG. 2 is a cross-sectional view of the luminaire taken along the section line 2—2 of FIG. 1.

Referring to the FIGURES, the same reference numerals refer to the same aspects of the present invention as illustrated in several views by FIGS. 1–3.

A compact backlighting luminaire of the present invention is indicated by reference numeral 10. Luminaire 10 has a main body 12 formed of optically clear glass or acrylic resin. Body 12 comprises a mesa 16 extending from a wedge-shaped base portion comprising a flange 14 extending around the periphery of mesa 16. Luminaire 10 is illuminated by a fluorescent lamp 18 formed to extend around the periphery of mesa 16 and to be supported by flange 14. Alternatively, illumination may be provided by a plurality of lamps placed around mesa 16. Lamp 18 generally has a longitudinal centerline in a plane that is parallel to a plane determined by the upper surface of flange 14 around mesa 16.

The upper surface of mesa 16 comprises a surface 20 that slopes from a left lateral edge of mesa 16 toward the base of body 12, and a surface 22 that slopes from a right lateral edge of mesa 16 towards the base of body 12. Surfaces 20 and 22 meet along a central line forming a shallow V-shaped through 34 best illustrated in FIG. 2. The wedge-shaped base of body 12 includes a lower surface 24 that slopes from bottom edge 28 to top edge 26 so that flange 14 is thicker at edge 26 than at edge 28 as shown in FIG. 3. Sloped surfaces 20, 22, and 24 are not limited to planar surfaces, as illustrated, but may comprise nonplanar surfaces, such as parabolic slopes, for example. Lower surface 24 and edge surfaces 26, 28, 30, and 32 may be coated with a reflective film so that light entering body 12 from lamp 18 is reflected internally until it is emitted from surfaces 20 and 22. A cover 36 fits over mesa 16 and aound flange 14 to secure lamp 18 and to provide a mounting surface for an LCD (not shown) to be illuminated by luminaire 10. The surfaces of cover 36, as well as the remaining surfaces of body 12, may be coated or treated as is well known in the prior art to improve the reflective or light emissive characteristics of the various surfaces of luminaire 10. In addition, the coatings may be applied nonuniformly so that the reflectivity varies as a function of the distance of the surface from lamp 18. The electrical leads 19 of lamp 18 may extend through slots in cover 36 or flange 14 to be connected to a power source (not shown) as is well known in the prior art.

The principle of the sloped or wedge-shaped surfaces of luminaire body 12 is to add the angle of the slope to each incident light ray as it strikes the surface of the glass or acrylic resin. In luminaire 10, little or no light from lamp 18 enters body 12 from the bottom edge edge of mesa 16 along edge 28. In alternative embodiments of luminaire 10 in which an illumination source completely surrounds the perimeter of mesa 16, lower surface 24 may not be sloped or may comprise two sloped surfaces, for example, meeting at a line running perpendicular to the line of trough 34. In addition, the principle of multiple wedged surfaces is not limited to the sloped surfaces 20, 22, and 24 illustrated for luminaire 10. For example, the upper surface of mesa 16 and the lower surface 24 may each comprise four sloped surfaces starting at each edge and converging at the center of luminaire 10.

The plurality of wedge-shaped surfaces of luminaire 10 aid in providing uniform brightness for illuminating LCDs such as full color flat panel displays. In addition, the transflective element typical of LCDs may be eliminated because of the compensating effect of the reflective coating on surface 24 of luminaire 10. Elimination of LCD transflectors may increase the brightness and efficiency of the illuminated LCD display while retaining sunlight readability. Furthermore, the use of multiple wedged surfaces in conjunction with fluorescent lighting around the periphery of the luminaire results in a significant saving of space because of the minimal depth dimension of the luminaire.

Although the present invention has been described with respect to specific embodiments thereof, various changes and modifications may be suggested to one skilled in the art. Therefore, it is intended that the present invention encompass such changes and modifications as fall within the scope of the appended claims.

I claim:

1. A luminaire for a liquid crystal display (LCD), comprising:

a body of optically clear material having a mesa and a base, said base forming a flange extending around said mesa;

a light source extending at least substantially halfway around said mesa;

said mesa having at least two joining, non-parallel upper surface for emitting light from said body; and a cover having a top forming a plane surface extending above said mesa and said light source, and having sides extending substantially perpendicular to said top and extending around said flange.

* * * * *